(12) United States Patent
Yoshida et al.

(10) Patent No.: US 8,993,674 B2
(45) Date of Patent: Mar. 31, 2015

(54) INKJET INK COPOLYMER AND INKJET INK PIGMENT DISPERSION AND INKJET INK USING THE SAME

(75) Inventors: Minoru Yoshida, Gifu (JP); Atsushi Ishikawa, Gifu (JP); Yoshiya Kobayashi, Gifu (JP); Kazuki Sase, Himeji (JP); Eiji Morimoto, Himeji (JP)

(73) Assignee: Sanyo Color Works, Ltd., Hyogo (JP)

( * ) Notice: Subject to any disclaimer, the term of this patent is extended or adjusted under 35 U.S.C. 154(b) by 0 days.

(21) Appl. No.: 14/001,712

(22) PCT Filed: Feb. 28, 2012

(86) PCT No.: PCT/JP2012/054934
§ 371 (c)(1),
(2), (4) Date: Aug. 27, 2013

(87) PCT Pub. No.: WO2012/118078
PCT Pub. Date: Sep. 7, 2012

(65) Prior Publication Data
US 2013/0338302 A1    Dec. 19, 2013

(30) Foreign Application Priority Data
Feb. 28, 2011   (JP) .................................. 2011-042766

(51) Int. Cl.
| | | |
|---|---|---|
| *C08G 61/08* | (2006.01) | |
| *C09D 11/30* | (2014.01) | |
| *C09D 11/326* | (2014.01) | |
| *C08F 220/18* | (2006.01) | |
| *C09D 11/106* | (2014.01) | |
| *C08F 220/06* | (2006.01) | |

(52) U.S. Cl.
CPC .............. *C09D 11/30* (2013.01); *C09D 11/326* (2013.01); *C08F 220/06* (2013.01); *C08F 220/18* (2013.01); *C09D 11/106* (2013.01)
USPC ........................................................ 524/553

(58) Field of Classification Search
USPC .......................................................... 524/553
See application file for complete search history.

(56) References Cited

U.S. PATENT DOCUMENTS

| | | | |
|---|---|---|---|
| 6,299,949 B1 * | 10/2001 | Shioda et al. ................. 428/1.5 | |
| 2008/0146727 A1 | 6/2008 | Yatake | |
| 2008/0268156 A1 * | 10/2008 | Ueno et al. .................... 427/288 | |
| 2010/0010148 A1 | 1/2010 | Imai et al. | |
| 2010/0203247 A1 | 8/2010 | Kariya et al. | |

FOREIGN PATENT DOCUMENTS

| | | |
|---|---|---|
| JP | 2004-107478 A | 4/2004 |
| JP | 2005-171223 A | 6/2005 |
| JP | 2006-117933 A | 5/2006 |
| JP | 2008-150408 A | 7/2008 |
| JP | 2008-239961 A | 10/2008 |
| JP | 2010-184429 A | 8/2010 |
| JP | 2011-12171 A | 1/2011 |

OTHER PUBLICATIONS

International Search Report dated Apr. 24, 2012, issued in corresponding to application No. PCT/JP2012/054934.

* cited by examiner

*Primary Examiner* — Ling Choi
*Assistant Examiner* — Thuy-Ai Nguyen
(74) *Attorney, Agent, or Firm* — Westerman, Hattori, Daniels & Adrian, LLP

(57) ABSTRACT

To provide an inkjet ink polymer capable of providing an inkjet ink capable of forming a printed product having excellent weather resistance, print density (coloring properties), and fixability (abrasion properties) with good productivity and providing a pigment dispersion having excellent dispersibility with good productivity. An inkjet ink copolymer contains 10 to 99% by weight of a cyclohexyl methacrylate unit and 1 to 90% by weight of an acrylic acid unit. The purpose is achieved by an inkjet ink pigment dispersion containing the inkjet ink copolymer and a pigment.

8 Claims, No Drawings

INKJET INK COPOLYMER AND INKJET INK PIGMENT DISPERSION AND INKJET INK USING THE SAME

TECHNICAL FIELD

The present invention relates to a copolymer and more specifically relates to a copolymer suitable for an inkjet ink. The present invention also relates to a pigment dispersion and an inkjet ink using the copolymer.

BACKGROUND ART

An inkjet recording system has been widely used at present from the reasons that high-speed recording is achieved, colorization is easy, a regular paper can be used as a recording member, and the like.

As an inkjet ink (hereinafter sometimes simply referred to as an ink) for use in this inkjet recording system, a dye ink and a pigment ink are mentioned. In recent years, the pigment ink which is excellent in weather resistance, color density, generation of bleeding, and the like has been widely used. In particular, in combination with the spread of digital cameras, a demand in the photograph printing field requiring high print density (coloring properties) has increased due to the height of the fastness of a printed product.

Since pigments for use in this pigment ink are basically insoluble in aqueous media and organic media, the ink or the pigment dispersion is obtained as one in which the pigments are dispersed in the media.

Therefore, the ink and the pigment dispersion have had a problem in that the pigments aggregate or the like in a long-term storage, so that it is difficult to maintain the dispersibility for a long period of time and stably store the same. With respect to the dispersion stability for a long period of time, a large number of measures for maintaining the dispersion stability, such as use of a specific polymer composition and modification of the pigment surface with a specific polymer, have been proposed (e.g., Patent Documents 1 and 2). For example, in a polymer composition described in Patent Document 1, the dispersion stability is excellent and also the gloss of a photograph printed product printed on a photograph paper can be increased similarly as in a silver halide photograph.

On the other hand, the dispersion stability of the pigment is improved to some extent by the use of a polymer described in Patent Document 2. However, the gloss, the print density (coloring properties), the fixability (abrasion properties), and the like, for example, of a printed product are affected in some cases and it cannot always satisfy a demand required in a printed product with high image quality in recent years. Moreover, the pigment surface is required to be modified with the polymer described above, and therefore there has been room for an improvement also in terms of the productivity.

When manufacturing the pigment dispersion and the inkjet ink, removal of particles of a size equal to or larger than a fixed size which may be contained in the pigment dispersion or the inkjet ink has been generally performed. As such treatment, filter filtration, centrifugal separation, and the like are mentioned. In the case where the number of particles to be removed is large, an exchange frequency of a filter and a removal frequency of particles removed by centrifugal separation have become high, so that the productivity of the pigment dispersion and the inkjet ink has decreased in some cases.

CITATION LIST

Patent Literatures

Patent Document 1: JP-A No. 2005-171223
Patent Document 2: Japanese Patent No. 4532387

SUMMARY OF INVENTION

Technical Problem

In view of the above-described problems, it is an object of the present invention to provide an inkjet ink polymer capable of providing an inkjet ink capable of forming a printed product having excellent weather resistance, print density (coloring properties), and fixability (abrasion properties) with good productivity and to provide a pigment dispersion having excellent dispersibility with good productivity.

Solution to Problem

In order to solve the above-described problems, the present inventors have extensively conducted research and as a result found that the above-described problems can be solved by the use of a copolymer containing a cyclohexyl methacrylate unit and an acrylic acid unit. Thus, the present invention has been accomplished. The gist of the invention is as follows.

(1) An inkjet ink copolymer containing 10 to 99% by weight of a cyclohexyl methacrylate unit and 1 to 90% by weight of an acrylic acid unit.

(2) The inkjet ink copolymer according to (1) above, in which the copolymer contains 1 to 25% by weight of an alkyl(meth)acrylate unit.

(3) The inkjet ink copolymer according to (1) or (2) above, in which the copolymer contains 1 to 25% by weight of a styrene unit.

(4) The inkjet ink copolymer according to any one of (1) to (3) above, in which the weight average molecular weight of the copolymer is 4500 to 150000.

(5) The inkjet ink copolymer according to any one of (1) to (4) above, in which the acid value of the copolymer is 10 to 300 mgKOH/g.

(6) An inkjet ink pigment dispersion containing the inkjet ink copolymer according to any one of (1) to (5) above and a pigment.

(7) The inkjet ink pigment dispersion according to (6) above, in which the average particle diameter of the pigment is 300 nm or lower.

(8) An ink jet ink containing the inkjet ink copolymer according to any one of (1) to (5) above.

Advantageous Effects of Invention

According to the inkjet ink copolymer according to the present invention, the pigment dispersion containing the copolymer has excellent dispersibility and a printed product of the inkjet ink containing the copolymer has excellent weather resistance, print density (coloring properties), and fixability (abrasion properties). Moreover, the pigment dispersion and the inkjet ink containing the copolymer are obtained with good productivity.

DESCRIPTION OF EMBODIMENTS

An inkjet ink copolymer according to the invention contains a copolymer containing 10 to 99% by weight of a cyclohexyl methacrylate unit and 1 to 90% by weight of an acrylic acid unit.

Thus, by the use of the copolymer containing the cyclohexyl methacrylate unit and the acrylic acid unit in a specific ratio, the effects of the invention can be demonstrated.

When the content of the cyclohexyl methacrylate (hereinafter sometimes referred to as "CHMA") unit is smaller than 10% by weight, it tends to be difficult to obtain sufficient coloring properties. When the content is larger than 99% by weight, the solubility in water decreases. Particularly in the case where media of a pigment dispersion and an inkjet ink described later are aqueous solvents, the dispersion stability tends to decrease. The content of the CHMA unit may be determined as appropriate according to the type, the combination, and the like of pigments and other components to be used in an inkjet ink pigment dispersion and an inkjet ink described later insofar as the content is in the range mentioned above. The lower limit is preferably 40% by weight or more and more preferably 50% by weight or more. The upper limit is preferably 96% by weight or lower, more preferably 90% by weight or lower, and still more preferably 80% by weight or lower.

When the content of the acrylic acid (hereinafter sometimes referred to as "AA") unit is smaller than 1% by weight, the solubility in water decreases, and, particularly in the case where media of a pigment dispersion and an inkjet ink described later are aqueous solvents, the dispersion stability tends to decrease. When the content is larger than 99% by weight, the hydrophilicity becomes excessively high, so that the adsorption properties to the pigment tend to decrease. The content of the AA unit may be determined as appropriate according to the type, the combination, and the like of pigments, media, and other components to be used in an inkjet ink pigment dispersion and an inkjet ink described later insofar as the content is in the range mentioned above. The lower limit is preferably 4% by weight or more, more preferably 10% by weight or more, and still more preferably 15% by weight or more. The upper limit is preferably 50% by weight or lower and more preferably 35% by weight or lower.

In the invention, the copolymer may contain 1 to 25% by weight of an alkyl(meth)acrylate unit. Thus, the glass transition temperature (Tg) of the copolymer becomes low and a further improvement of abrasion properties can be expected. The content of the alkyl(meth)acrylate unit may be determined as appropriate according to the type, the combination, and the like of pigments and other components to be used in an inkjet ink pigment dispersion and an inkjet ink described later insofar as the content is in the range mentioned above. The lower limit is more preferably 5% by weight or more. The upper limit is more preferably 20% by weight or lower and still more preferably 15% by weight or lower.

An alkyl group constituting the alkyl(meth)acrylate unit is not particularly limited, the number of carbon atoms is not particularly limited, and the structure may be either a straight chain structure or a branched chain structure. From the viewpoint of the dispersibility, the number of carbon atoms is preferably 1 to 18 and more preferably 4 to 12. In particular, as the alkyl(meth)acrylate unit, butyl acrylate, butyl methacrylate, lauryl acrylate, and lauryl methacrylate are particularly preferable. The butyl(meth)acrylates may be any of an isobutyl(meth)acrylate, tert-butyl(meth)acrylates, and mixtures thereof.

In the invention, the copolymer may contain 1 to 25% by weight of a styrene (hereinafter sometimes referred to as "St") unit. Thus, a further improvement of abrasion properties can be expected and also the polymerization reactivity becomes better, so that an improvement of the productivity can be secondarily expected. The content of the St unit may be determined as appropriate according to the type, the combination, and the like of pigments and other components to be used in an inkjet ink pigment dispersion and an inkjet ink described later insofar as the content is in the range mentioned above. The upper limit is more preferably 20% by weight or lower and still more preferably 5% by weight or lower.

In the invention, the weight average molecular weight of the copolymer is not particularly limited and is preferably 4500 to 150000, more preferably 4500 to 30000, and particularly preferably 4500 to 20000 from the viewpoint of the dispersibility and the storage stability of the dispersion.

In the invention, the acid value of the copolymer is not particularly limited and is preferably 10 to 300 mgKOH/g from the viewpoint of the dispersibility and the coloring properties. The lower limit is more preferably 30 mgKOH/g or more and still more preferably 100 mgKOH/g or more. The upper limit is more preferably 250 mgKOH/g or lower and still more preferably 200 mgKOH/g or lower.

In the invention, the copolymer contains a cyclohexyl methacrylate unit and an acrylic acid unit as an indispensable constitutional unit and contains an alkyl(meth)acrylate unit and/or a styrene unit as an arbitrary component and may contain other constitutional units insofar as the effects of the invention are demonstrated.

The copolymer can be synthesized by a known usual method. A method for adding monomers in such a polymerization method is not particularly limited. The monomers may be collectively charged in a reaction solvent in an early stage of a reaction or at least one kind of the monomers to be used may be continuously or intermittently added to a reaction system. The polymerization may be performed in the presence of a radical polymerization initiator and/or a catalyst. The polymerization may be performed in the presence of inactive gas, such as nitrogen gas, as required.

After the completion of the polymerization reaction, the copolymer can be obtained by removing the reaction solvent by distillation under reduced pressure or the like.

As the solvent to be used in the polymerization, alcohol solvents, ketone solvents, ester solvents, ether solvents, and glycol ether solvents can be used.

As the alcohol solvents, methanol, ethanol, isopropanol, 1-butanol, tertiary butanol, isobutanol, diacetone alcohol, and the like are mentioned, for example.

As the ketone solvents, acetone, methyl ethyl ketone, diethyl ketone, methyl isobutyl ketone, cyclohexanone, and the like are mentioned, for example.

As the ester solvents, ethyl acetate, methyl acetate, butyl acetate, methoxy butyl acetate, cellosolve acetate, amyl acetate, normal propyl acetate, isopropyl acetate, methyl lactate, ethyl lactate, butyl lactate, and the like are mentioned, for example.

As the ether solvents, dibutyl ether, tetrahydrofuran, dioxane, and the like are mentioned, for example.

As the glycol ether solvents, ethylene glycol monomethyl ether, diethylene glycol monomethyl ether, diethylene glycol monoethyl ether, diethylene glycol diethyl ether, butylcellosolve, and the like are mentioned, for example.

As the radical polymerization initiator, organic peroxides, such as t-butyl peroxy(2-ethylhexanoate), di-t-butyl peroxide, t-butyl peroxybenzoate, and t-butyl peroxy octoate; azo compounds, such as 2,2-azobisisobutyronitrile, 2,2'-azobis(2,4-dimethylvaleronitrile), dimethyl-2,2'-azobisbutyrate, and 2,2'-azobis(2-methylbutyronitrile), and the like are preferable.

The use amount of the radical polymerization initiators mentioned above is not particularly limited. The use amount can be set according to the weight average molecular weight of the copolymer and is preferably set to 30% by mole or lower based on all the monomers.

The temperature and the time of the polymerization are not particularly restrained and the conditions may be adjusted as appropriate according to the weight average molecular weight of the copolymer to be synthesized.

The shape of the inkjet ink copolymer obtained as described above can be finally formed into a liquid shape, a paste shape, a powder shape, and the like.

In such a case, the inkjet ink copolymer according to the invention may be configured to contain, as other components, media such as water and organic solvents, and other arbitrary components such as a pH adjuster, an antifoaming agent, a wetting agent, and an antiseptic agent. The addition amount of the arbitrary components may be determined according to the function and the like of the arbitrary components.

The pH adjuster is not particularly limited insofar as the pH can be controlled to a desired pH and known substances can be used. For example, organic amines, such as methylamine and ethyl amine; lower alkanolamines such as monoethanolamine, diethanolamine, and triethanolamine inorganic bases such as ammonium hydroxide, sodium hydroxide, and potassium hydroxide, and the like are mentioned.

In the invention, the content ratio of each unit is specified based on the weight as described above. In the calculation of the content ratio of each unit constituting the copolymer of the invention, the radical polymerization initiator and the catalyst to be used in the polymerization reaction are not considered in principle. The component composition of the copolymer of the invention can be measured by performing pretreatment as required and using gas chromatograph (GC-MS) or a nuclear magnetic resonance (NMR) spectroscopy according to a usual method. When monomers serving as the basis of each unit to be compounded substantially all react as in Examples and Comparative Example described later, the content ratio of each unit can be calculated based on the compounded monomers excluding the initiator described above.

Next, an inkjet ink pigment dispersion of the invention is described.

The inkjet ink pigment dispersion contains the inkjet ink copolymer described above and a pigment.

The pigment is not particularly limited and any pigment may be used insofar as the pigment is used for an inkjet ink. From the viewpoint of an improvement of dispersibility and the viewpoint of the discharge properties from ink discharging nozzles to be provided in an inkjet recording system printing machine, the average particle diameter of the pigment is preferably 300 nm or lower and more preferably 150 nm or lower. In the invention, the average particle diameter of the pigment refers to a measured value obtained when measuring particles contained in the inkjet ink pigment dispersion with a laser zeta electrometer.

In the invention, the average primary particle diameter of the pigment is preferably 20 to 120 nm from the viewpoint of coloring properties. The pigment contained in the pigment dispersion is generally present as one in which a plurality of primary particles of the pigment aggregate. The average particle diameter of the pigment contained in the inkjet ink pigment dispersion described above is grasped as an average particle diameter of such an aggregate.

A method for miniaturizing the average primary particle diameter of the pigment to be in the range mentioned above is not particularly limited insofar as the inkjet ink pigment dispersion and an inkjet ink are not adversely affected. For example, a method using sulfuric acid, a method utilizing mechanical grinding using a mixer and the like, are mentioned.

As the pigment, various kinds of color pigments, such as yellow (yellow type), magenta (red type), cyan (blue type), and black (black type) can be used. Various kinds of color pigments may be used singly or in combination of two or more kinds thereof.

As the yellow color pigment, when indicated by the Color Index Number (C.I. No.), C.I. No. PY-55, PY-74, PY-79, PY-93, PY-110, PY-120, PY-128, PY-138, PY-139, PY-150, PY-151, PY-155, PY-156, PY-175, and the like are mentioned, for example.

As the magenta color pigment, C.I. No. PR-122, a solid solution of PR-122/PR-254, PV-19, and the like are mentioned, for example.

As the cyan color pigment, C.I. No. PB-15:3, PB-15:4, PB-15:1, aluminum phthalocyanine, and the like are mentioned, for example.

As the black (black) color pigment, carbon black is common but, in addition thereto, titanium black and the like are mentioned.

The shape of the pigment is not particularly limited and may be at any shape of a paste, powder, a solid solution, and the like.

The content of the pigment contained in the inkjet ink pigment dispersion of the invention is not particularly limited and may be set to about 50 to 1000 parts by weight based on 100 parts by weight of the inkjet ink polymer.

To the inkjet ink pigment dispersion of the invention, media and other arbitrary components can be added in addition to the inkjet ink copolymer and the pigment.

As the medium, any one of organic solvents and aqueous solvents may be used.

As the organic solvents, organic solvents such as alcohols, ketones, esters, glycol ethers, glycol acetates, saturated hydrocarbons, unsaturated hydrocarbons, annular saturated hydrocarbons, annular unsaturated hydrocarbons, and aromatic hydrocarbons, which are generally used in an inkjet ink, can be widely used.

As the aqueous solvents, water and/or water-soluble organic solvents are mentioned. As water, pure water and ultrapure water such as ion exchange water, ultra filtration water, reverse osmosis water, and distilled water can be used, for example. The water-soluble organic solvents are not particularly limited insofar as they are generally used for an inkjet ink. Specifically, those having vapor pressure lower than that of water, for example, polyhydric alcohols such as diethylene glycol, polyhydric alcohol ethers such as triethylene glycol monobutyl ether, ketones, esters, lower alkoxy alcohols, amines, amides, heterocycles, sulfoxides, and sulfones, are mentioned. Moreover, those which are sterilized by ultraviolet ray treatment, hydrogen peroxide solution treatment, and the like may be used for the purpose of preventing generation of mold, bacteria, and the like.

The content of the medium contained in the inkjet ink pigment dispersion of the invention is not particularly limited and may be set to about 200 to 600 parts by weight based on 100 parts by weight of the pigment.

As other arbitrary components, a dispersing agent, a surface tension adjustment agent or a penetrant (surfactant), a wet drying inhibitor, an antiseptic agent, a disinfectant, a pH adjuster, an antirust agent, a moisturizer, and the like are mentioned, for example. These substances may be used singly or in combination of two or more kinds thereof.

The inkjet ink pigment dispersion of the invention is excellent in filter filterability which is measured by a method described later. Therefore, in the pigment dispersion, the content of large particles which may considerably affect the discharge properties from inkjet ink nozzles is reduced. When the pigment dispersion is used for an inkjet ink, stable discharge of the inkjet ink from the nozzles can be achieved. Due to the fact that the filter filterability is excellent as described, the inkjet ink pigment dispersion can be obtained with good productivity.

In the inkjet ink pigment dispersion of the invention, the viscosity measured by a method described later is preferably about 2 to 50 mPa·s. Thus, when the pigment dispersion is used for an inkjet ink, the viscosity of the inkjet ink can be maintained at a low viscosity, so that stable discharge of the inkjet ink from nozzles can be achieved and good discharge performance can be obtained.

In the inkjet ink pigment dispersion of the invention, particularly in the case where an aqueous solvent is used, the pH is preferably about 7 to 10. Thus, the storage stability of the pigment dispersion becomes good.

A method for manufacturing the inkjet ink pigment dispersion of the invention is not particularly limited. For example, a method for charging the inkjet ink polymer of the invention, a pigment, a medium, and other arbitrary components, and dispersing them with a (high-speed) disper or the like are mentioned. Furthermore, the mixture may be dispersed as required with a bead mill, a roll mill, or the like. Then, finally, in order to remove particles of a size equal to or larger than a fixed size which may be contained in the obtained, pigment dispersion, filter filtration or centrifugal separation is performed. When performing filter filtration, the pore diameter (mesh size) of a filter may be selected as appropriate in order to adjust the particle diameter of the particles contained in the pigment dispersion to be a predetermined particle diameter as required. The filter filtration may be performed in the stage of the pigment dispersion and may be performed in the stage of preparing the inkjet ink or in each stage of the preparation of the pigment dispersion and the preparation of the inkjet ink.

The inkjet ink of the invention is not limited in the configuration insofar as the inkjet ink copolymer described above is contained. The inkjet ink can be prepared by known methods by selecting pigments, media, and other arbitrary components, which are generally known as those to be compounded in the inkjet ink, as appropriate in addition to the inkjet ink copolymer. The content of each component contained in the inkjet ink is not particularly limited. The content of the pigment is preferably about 2 to 10% by weight, the content of the inkjet ink copolymer is preferably about 1 to 10% by weight, and the content of the medium is preferably about 70 to 97% by weight.

In the invention, it is preferable to prepare the inkjet ink by adding arbitrary components such as a medium and a surfactant, to the inkjet ink pigment dispersion containing the inkjet ink copolymer described above, and then mixing and stirring. The mixing and stirring method is not particularly limited and a general mixer may be used or a bead mill may be used in order to further increase the dispersibility of the pigment. As required, in order to remove particles of a size equal to or larger than a fixed size, which can be contained in the ink, filter filtration and the like may be performed.

As the medium, the solvent for use in the preparation of the inkjet ink pigment dispersion can be used. Moreover, also as the arbitrary components, various additives and the like for use in the preparation of the pigment dispersion can be used as required. The addition amount thereof may be adjusted in such a manner that each component has the content described above.

The inkjet ink of the invention described above is excellent in print density (coloring properties) and fixability (abrasion properties) of a printed product. Moreover, since the inkjet ink copolymer of the invention is contained, the filter filterability evaluated by a method described later is excellent and the inkjet ink can be obtained with good productivity, for example.

EXAMPLES

In order to describe the invention, some Examples are shown below but the invention is not limited thereto. The measurement conditions of each property are as follows.

<Measurement of Acid Value>

0.2 part by weight of each copolymer obtained in Examples and Comparative Examples was dissolved in 60 parts by weight of acetone, and then measured using a 0.1 mol/L ethanolic potassium hydroxide solution with an automatic acid value meter (manufactured by Hiranuma Sangyo Corporation, AUTO TITRATOR COM-1600).

<Measurement of Weight Average Molecular Weight>

The weight average molecular weight is measured by a gel permeation chromatography (GPC) method using an HLC-8220GPC manufactured by Tosoh Corporation. With respect to the weight average molecular weight, polystyrene (manufactured by Tosoh Corporation, TSK standard polystyrene) is used as a reference material, and then the weight average molecular weight is calculated as a value converted to the molecular weight thereof.

<Measurement of Average Particle Diameter>

The average particle diameter of particles in each aqueous inkjet ink pigment dispersion described later is measured with a laser zeta electrometer (ELS-8000, manufactured by Otsuka Electronics Co., Ltd).

<Measurement of Viscosity>

The viscosity of each aqueous inkjet ink pigment dispersion described later is measured at 25° C. using a TV-22 type viscometer manufactured by TOKI SANGYO CO., LTD.

<Measurement of pH>

The pH of each aqueous inkjet ink pigment dispersion described later is measured at 25° C. using a pH meter F-54 manufactured by HORIBA, LTD.

<Filter Filterability>

Each aqueous inkjet ink pigment dispersion described later is filtered with a 10 ml capacity needle-less syringe [manufactured by Terumo Corporation, ss-10SZ] equipped with a filter having a pore diameter of 5 μm (manufactured by Sartorius, Minisart (registered trademark)). Then, the filter filterability is evaluated by the passing liquid amount until one filter is clogged. When the passing liquid amount until one filter is clogged is larger, the filterability is better. The judgment criteria are as follows.

o: The passing liquid, amount is 100 ml or more.

Δ: The passing liquid amount is 10 ml or more and lower than 100 ml x: The passing liquid amount is lower than 10 ml <Evaluation of Print Density>

Solid printing is performed on a regular paper (manufactured by Seiko Epson Corp., Double sided high quality regular paper) using each inkjet ink described later with an inkjet printer, and then the print density (optical density: OD) is measured to be used as the index of coloring properties. For the optical density (OD), a value obtained by measuring the OD for a single sample at 5 points using GRETAG (registered trademark) RD-19 manufactured by Gretag-Macbeth AG, and then averaging the OD values is adopted.

<Evaluation of Abrasion Properties>

Solid printing is performed on a regular paper (manufactured by Seiko Epson Corp., Double sided high quality regular paper) using each inkjet ink described later with an inkjet printer, and then the OD is measured in the same manner as in the evaluation of the print density. Next, the surface of the solid printing portion is rubbed back and forth 5 times with an eraser for office work (MONO (registered trademark), manufactured by TOMBOW PENCIL CO., LTD), and then the OD is similarly measured. Then, the OD residual ratio (%) before and after the test represented by Equation below is calculated, and then the abrasion properties are evaluated by the following judgment criteria.

OD residual ratio (%)=(OD value after abrasion property test)/(OD value before abrasion property test)×100 o: The OD residual ratio is 90% or more.
Δ: The OD residual ratio is 70% or more and lower than 90%.
x: The OD residual ratio is lower than 70%.
<Preparation of Polymer>

Example 1

The atmosphere in a 1000 ml separable flask having a stirring device, a cooler, a thermometer, and a dropping funnel was replaced by nitrogen, 200 parts by weight of butyl acetate was placed in the separable flask, and then the temperature was increased to 100° C. under stirring. Subsequently, 200 parts by weight of butyl acetate, 252 parts by weight of cyclohexyl methacrylate (CHMA), 4 parts by weight of styrene (St), 56 parts by weight of butyl acrylate (BA), 88 parts by weight of acrylic acid (AA), and 14 parts by weight of azobisisobutyronitrile were placed in the dropping funnel, and then added dropwise into the separable flask at 100° C. over 4 hours. After the completion of the dropwise addition, the resultant substance was held for 1 hour to complete the reaction. The end point of the reaction was judged by measuring unreacted monomers in the reaction liquid by gas chromatography. Thereafter, the butyl acetate was removed by distillation under reduced pressure, thereby obtaining a copolymer.

The obtained copolymer had an acid value of 160 mg-KOH/g and a weight average molecular weight of 5300. The composition, the acid value, and the weight average molecular weight of the copolymer are shown in Table 1.

Examples 2 to 4

Copolymers were obtained in the same manner as in Example 1, except using CHMA and AA while changing the use amount in such a manner as to achieve the compositions shown in Table 1. The acid value and the weight average molecular weight of the obtained copolymers are shown in Table 1.

Examples 5 to 8, 10, and 11

Copolymers were obtained in the same manner as in Example 1, except using CHMA and AA while changing the use amount in such a manner as to achieve the compositions shown in Table 1 and using 6 parts by weight of azobisisobutyronitrile. The acid value and the weight average molecular weight of the obtained copolymers are shown in Table 1.

Example 9

A copolymer was obtained in the same manner as in Example 5, except using 212 parts by weight of CHMA, 60 parts by weight of BA, and 128 parts by weight of AA (not adding St) in such a manner as to achieve the composition shown in Table 1. The acid value and the weight average molecular weight of the obtained copolymer are shown in Table 1.

Examples 12 to 14

Copolymers were obtained in the same manner as in Example 1, except using CHMA and AA while changing the use amount in such a manner as to achieve the compositions shown in Table 2 and using 3 parts by weight of azobisisobutyronitrile. The acid value and the weight average molecular weight of the obtained copolymers are shown in Table 2.

Example 15

A copolymer was obtained in the same manner as in Example 1, except using CHMA and AA in such a manner that the use amount thereof is as shown in the composition shown in Table 2 and using 2 parts by weight of azobisisobutyronitrile. The acid value and the weight average molecular weight of the obtained copolymer are shown in Table 2.

Example 16

The atmosphere in a 1000 ml separable flask having a stirring device, a cooler, a thermometer, and a dropping funnel was replaced by nitrogen, 200 parts by weight of butyl acetate was placed in the separable flask, and then the temperature was increased to 80° C. under stirring. Subsequently, 200 parts by weight of butyl acetate, 252 parts by weight of CHMA, 4 parts by weight of St, 56 parts by weight of BA, 88 parts by weight of AA, and 3 parts by weight of azobisisobutyronitrile were placed in the dropping funnel, and then added dropwise into the separable flask at 80° C. over 4 hours. After the completion of the dropwise addition, the resultant substance was held for 1 hour to complete the reaction. The end point of the reaction was judged by measuring unreacted monomers in the reaction liquid by gas chromatography. Thereafter, the butyl acetate was removed by distillation under reduced pressure, thereby obtaining a copolymer.

The acid value and the weight average molecular weight of the copolymer are shown in Table 2.

Example 17

A copolymer was obtained in the same manner as in Example 16, except using CHMA and AA while changing the use amount in such a manner as to achieve the composition shown in Table 2. The acid value and the weight average molecular weight of the obtained copolymer are shown in Table 2.

Example 18

The atmosphere in a 1000 ml separable flask having a stirring device, a cooler, a thermometer, and a dropping funnel was replaced by nitrogen, 200 parts by weight of butyl acetate was placed in the separable flask, and then the temperature was increased to 95° C. under stirring. Subsequently, 200 parts by weight of butyl acetate, 308.8 parts by weight of CHMA, 4 parts by weight of St, 87.2 parts by weight of AA, and 14 parts by weight of azobisisobutyronitrile were placed in the dropping funnel, and then added dropwise into the separable flask at 95° C. over 4 hours. After the completion of the dropwise addition, the resultant substance was held for 1 hour to complete the reaction. The end point of the reaction was judged by measuring unreacted monomers in the reaction liquid by gas chromatography. Thereafter, the butyl acetate was removed by distillation under reduced pressure, thereby obtaining a copolymer.

The acid value and the weight average molecular weight of the copolymer are shown in Table 3.

Examples 19 to 21

Copolymers were obtained in the same manner as in Example 18, except using CHMA and AA while changing the use amount in such a manner as to achieve the compositions shown in Table 3. The acid value and the weight average molecular weight of the obtained copolymers are shown in Table 3.

Examples 22 to 25

Copolymers were obtained in the same manner as in Example 18, except using CHMA and AA while changing the use amount in such a manner as to achieve the compositions shown in Table 3 and using 6 parts by weight of azobisisobutyronitrile. The acid value and the weight average molecular weight of the obtained copolymers are shown in Table 3.

Examples 26 to 29

Copolymers were obtained in the same manner as in Example 18, except using CHMA and AA while changing the use amount in such a manner as to achieve the compositions shown in Table 3 and using 2 parts by weight of azobisisobutyronitrile. The acid value and the weight average molecular weight of the obtained copolymers are shown in Table 3.

Example 30

A copolymer was obtained in the same manner as in Example 1, except using 282 parts by weight of CHMA, 4 parts by weight of BA, 110 parts by weight of AA, and 4 parts by weight of St in such a manner as to achieve the composition shown in Table 4. The acid value and the weight average molecular weight of the obtained copolymer are shown in Table 4.

Example 31

A copolymer was obtained in the same manner as in Example 1, except using 186 parts by weight of CHMA, 100 parts by weight of BA, 110 parts by weight of AA, and 4 parts by weight of St in such a manner as to achieve the composition shown in Table 4. The acid value and the weight average molecular weight of the obtained copolymer are shown in Table 4.

Example 32

A copolymer was obtained in the same manner as in Example 1, except using 186 parts by weight of CHMA, 4 parts by weight of BA, 110 parts by weight of AA, and 100 parts by weight of St in such a manner as to achieve the composition shown in Table 4. The acid value and the weight average molecular weight of the obtained copolymer are shown in Table 4.

Example 33

A copolymer was obtained in the same manner as in Example 1, except using 252 parts by weight of CHMA, 56 parts by weight of laurylacrylate (LMA), 88 parts by weight of AA, and 4 parts by weight of St in such a manner as to achieve the composition shown in Table 7. The acid value and the weight average molecular weight of the obtained copolymer are shown in Table 7.

Comparative Example 1

The atmosphere in a 1000 ml separable flask having a stirring device, a cooler, a thermometer, and a dropping funnel, was replaced by nitrogen, 200 parts by weight of butyl acetate was placed in the separable flask, and then the temperature was increased to 100° C. under stirring. Subsequently, 200 parts by weight of butyl acetate, 256 parts by weight of benzyl acrylate (BzA), 76 parts by weight of methacrylic acid (MAA), 4 parts by weight of St, 64 parts by weight of AA, and 6 parts by weight of azobisisobutyronitrile were placed in the dropping funnel, and then added dropwise into the separable flask at 100° C. over 4 hours. After the completion of the dropwise addition, the resultant substance was held for 1 hour to complete the reaction. The end point of the reaction was judged by measuring unreacted monomers in the reaction liquid by gas chromatography. Thereafter, the butyl acetate was removed by distillation under reduced pressure, thereby obtaining a copolymer.

The acid value and the weight average molecular weight of the copolymer are shown in Table 5.

Comparative Example 2

A copolymer was obtained in the same manner as in Comparative Example 1, except using 208 parts by weight of BzA, 104 parts by weight of MAA, and 88 parts by weight of AA (not adding St) in such a manner as to achieve the composition shown in Table 5, The acid value and the weight average molecular weight of the obtained copolymer are shown in Table 5.

Comparative Example 3

A copolymer was obtained in the same manner as in Comparative Example 1, except using 282 parts by weight of BzA, 64 parts by weight of MAA, 54 parts by weight of AA (not adding St), and 3 parts by weight of azobisisobutyronitrile in such a manner as to achieve the composition shown in Table 5. The acid value and the weight average molecular weight of the obtained copolymer are shown in Table 5.

Comparative Example 4

The atmosphere in a 1000 ml separable flask having a stirring device, a cooler, a thermometer, and a dropping funnel, was replaced by nitrogen, 200 parts by weight of butyl acetate was placed in the separable flask, and then the temperature was increased to 100° C. under stirring. Subsequently, 200 parts by weight of butyl acetate, 286 parts by weight of benzyl methacrylate (BzMA), 114 parts by weight of AA, 2 parts by weight of St, and 3 parts by weight of azobisisobutyronitrile were placed in the dropping funnel, and then added dropwise into the separable flask at 100° C. over 4 hours. After the completion of the dropwise addition, the resultant substance was held for 1 hour to complete the reaction. The end point of the reaction was judged by measuring unreacted monomers in the reaction liquid by gas chromatography. Thereafter, the butyl acetate was removed by distillation under reduced pressure, thereby obtaining a copolymer.

The acid value and the weight average molecular weight of the copolymer are shown in Table 5.

Comparative Example 5

The atmosphere in a 1000 ml separable flask having a stirring device, a cooler, a thermometer, and a dropping funnel was replaced by nitrogen, 200 parts by weight of butyl acetate was placed in the separable flask, and then the temperature was increased to 90° C. under stirring. Subsequently, 200 parts by weight of butyl acetate, 276 parts by weight of cyclohexylacrylate (CHA), 64 parts by weight of MAA, 56 parts by weight of AA, 4 parts by weight of St, and 3 parts by weight of azobisisobutyronitrile were placed in the dropping funnel, and then added dropwise into the separable flask at 90° C. over 4 hours. After the completion of the dropwise addition, the resultant substance was held for 1 hour to complete the reaction. The end point of the reaction was judged by measuring unreacted monomers in the reaction liquid by gas chromatography. Thereafter, the butyl acetate was removed by distillation under reduced pressure, thereby obtaining a copolymer.

The acid value and the weight average molecular weight of the copolymer are shown in Table 5.

Comparative Example 6

A copolymer was obtained in the same manner as in Comparative Example 5, except using CHA, MAA, and AA while changing the use amount in such a manner as to achieve the composition shown in Table 5. The acid value and the weight average molecular weight of the obtained copolymer are shown in Table 5.

Comparative Example 7

The atmosphere in a 1000 ml separable flask having a stirring device, a cooler, a thermometer, and a dropping funnel was replaced by nitrogen. 200 parts by weight of butyl acetate was placed in the separable flask, and then the temperature was increased to 100° C. under stirring. Subsequently, 200 parts by weight of butyl acetate, 269 parts by weight of CHA, 74 parts by weight of MAA, 62 parts by weight of AA, 4 parts by weight of St, and 6 parts by weight of azobisisobutyronitrile were placed in the dropping funnel, and then added dropwise into the separable flask at 100° C. over 4 hours. After the completion of the dropwise addition, the resultant substance was held for 1 hour to complete the reaction. The end point of the reaction was judged by measuring unreacted monomers in the reaction liquid by gas chromatography. Thereafter, the butyl acetate was removed by distillation under reduced pressure, thereby obtaining a copolymer.

The acid value, and the weight average molecular weight of the copolymer are shown in Table 8.

<Preparation of Pigment Dispersion>
(Preparation of Black Pigment Dispersion)

The copolymer prepared in each Example and each Comparative Example was used as a use sample (Specific use samples are shown in Tables 1 to 5.), 6.37 parts by weight of the copolymer, 2.57 parts by weight of an aqueous 30% sodium hydroxide solution, 25 parts b weight of a black pigment (Pigment Black 7; Average primary particle diameter of the pigment: 20 nm; manufactured by Mitsubishi Chemical, Inc., MA600), and 104.7 parts by weight of ion exchange water were mixed, and then stirred with a high-speed disper for 1 hour, thereby obtaining a pigment dispersion slurry.

The pigment dispersion slurry was placed in a cylindrical container filled with zirconia beads with a diameter of 0.5 mm, and then dispersed with an agitator at a number of rotations of 2000 rpm for 3 hours, thereby obtaining a dispersion.

The obtained dispersion was filtered with a filter with a pore diameter of 5 μm (manufactured by Sartorius), and then ion exchange water was added in such a manner that the pigment concentration was 15% by weight, thereby preparing an aqueous inkjet ink pigment dispersion. The obtained inkjet ink pigment dispersions were subjected to the above-described evaluation (Measurement of average particle diameter, Measurement of viscosity, and Measurement of pH). The evaluation results are shown in Tables 1 to 5.

(Preparation of Blue Pigment Dispersion)
(1) Preparation of Blue Pigment Paste 50 parts by weight of a blue pigment (manufactured by DIC, "CYANINE Blue KRO", PB-15:3), 500 parts by weight of sodium chloride (Average particle diameter: 10 μm), and 100 parts by weight of diethylene glycol (manufactured by Tokyo Chemical Industry Co., Ltd.) were charged in a 1 gallon stainless steel kneader (manufactured by INOUE MFG., INC), and kneaded at 50° C. for 7 hours. Next, the mixture was placed in about 3000 parts by weight of warm water, and stirred with a high speed mixer for about 1 hour under heating to about 80° C. to form a slurry. Thereafter, according to an usual method, the slurry was filtered and washed with water, and then the sodium chloride and the solvent were removed, thereby obtaining 180 parts by weight of a blue pigment paste (Average primary particle diameter of the pigment: 50 nm).

(2) Preparation of Blue Pigment Dispersion

The copolymer prepared in each Example and each Comparative Example was used as a use sample (Specific use samples are shown in Tables 6 to 8), 6.73 parts by weight of the copolymer, 2.57 parts by weight of an aqueous 30% sodium hydroxide solution, 25 parts by weight (Pigment concentration: 25% by weight) of the blue pigment paste prepared in (1) above, and 29.7 parts by weight of ion exchange water were mixed, and then stirred with a high-speed disper for 1 hour, thereby obtaining a pigment dispersion slurry.

The pigment dispersion slurry was treated in the same manner as in the preparation of the black pigment dispersion above, thereby preparing an aqueous inkjet ink pigment dispersion. The obtained inkjet ink pigment dispersions were subjected to the above-described evaluation (Measurement of average particle diameter, Measurement of viscosity, and Measurement of pH). The evaluation results are shown in Tables 6 to 8.

(Preparation of Red Pigment Dispersion)
(1) Preparation of Red Pigment Paste 50 parts by weight of a red pigment ("FASTOGEN Super Magenta RTS" manufactured by DIC, PR-122), 500 parts by weight of sodium chloride (Average particle diameter: 10 μm), and 100 parts by weight of diethylene glycol (manufactured by Tokyo Chemical Industry Co., Ltd.) were charged in a 1 gallon stainless steel kneader (manufactured b INOUE MFG., INC), and kneaded at 60° C. for 7 hours. Next, the mixture was placed in about 3000 parts by weight of warm water, and stirred with a high speed mixer for about 1 hour under heating to about 80° C. to form a slurry. Thereafter, the slurry was filtered and washed with water, and then the sodium chloride and the solvent were removed, thereby obtaining 180 parts by weight of a red pigment paste (average primary particle diameter of the pigment: 50 nm).

(2) Preparation of Red Pigment Dispersion

The copolymer prepared in each Example and each Comparative Example was used as a use sample (Specific use samples are shown in Tables 9 and 10), 6.37 parts by weight of the copolymer, 2.57 parts by weight of an aqueous 30% sodium hydroxide solution, 100 parts by weight (Pigment concentration: 25% by weight) of the red pigment paste prepared in (1) above, and 29.7 parts by weight of ion exchange water were mixed, and then stirred with a high-speed disper for 1 hour, thereby obtaining a pigment dispersion slurry.

The pigment dispersion slurry was treated in the same manner as in the preparation of the black pigment dispersion above, thereby preparing an aqueous inkjet ink pigment dispersion. The obtained inkjet ink pigment dispersions were subjected to the above-described evaluation (Measurement of average particle diameter, Measurement of viscosity, and Measurement of pH). The evaluation results are shown in Tables 9 and 10.

(Preparation of Yellow Pigment Dispersion)

The copolymer prepared in each Example and each Comparative Example was used as a use sample (Specific use samples are shown in Tables 11 and 12), 6.37 parts by weight of the copolymer, 2.57 parts by weight of an aqueous 30% sodium hydroxide solution, 100 parts by weight (Pigment concentration: 25% by weight) of a yellow pigment. (PY-74: Average primary particle diameter of the pigment: 57 nm, manufactured by Sanyo Color Works, Ltd., Fast Yellow 7413-A), and 29.7 parts by weight of ion exchange water were mixed, and then stirred with a high-speed disper for 1 hour, thereby obtaining a pigment dispersion slurry.

The pigment dispersion slurry was treated in the same manner as in the preparation of the black pigment dispersion above, thereby preparing an aqueous inkjet ink pigment dispersion. The obtained inkjet ink pigment dispersions were subjected to the above-described evaluation (Measurement of average particle diameter, Measurement of viscosity, and Measurement of pH). The evaluation results are shown in Tables 11 and 12.

Preparation of Inkjet Ink>

Each of the black and blue inkjet ink pigment dispersions above (Pigment concentration: 15% by weight) was used, with the compositions shown in Table 13, aqueous media (water, triethylene glycol monobutyl ether, and diethylene glycol) and a surfactant (Surfynol 465, manufactured by Air Products Inc.) were mixed with each pigment dispersion, and then stirred, thereby obtaining a black inkjet ink and a blue inkjet ink.

Moreover, each of the red and yellow inkjet ink pigment dispersions (Pigment concentration: 15% by weight) was used, and each component were mixed with the compositions shown in Table 14, and then stirred, thereby preparing a black inkjet ink and blue inkjet ink.

Each inkjet ink obtained as described above was subjected to the above-described evaluation (Print density and abrasion properties). The evaluation results are shown in Tables 1 to 12.

Tables 1 to 4 show that by the use of each copolymer of Examples 1 to 32, each black pigment dispersion contains a pigment with a predetermined average particle diameter, the dispersibility is secured and also particularly the filter filterability of all the dispersions is evaluated as "o" and the productivity is also excellent. Furthermore, the OD of each inkjet ink using each black pigment dispersion is 1.16 to 1.30 (which tends to be higher than those of Comparative Examples in most cases) and also the abrasion properties are evaluated as "o" and the print, evaluation is excellent in most cases. On the other hand, Table 5 shows that when the copolymers of Comparative Examples 1 to 6 were used, either the evaluation of particularly the filter filterability of the black pigment dispersions or the print evaluation of each inkjet ink using each black pigment dispersion (The OD is 1.10 to 1.22, which tends to be lower than those of Examples in most cases. The abrasion properties are evaluated as "Δ" or "x") not Satisfactory.

As is understood from Tables 6 to 12, also in the case where each of the blue, red, and yellow pigments was used, it is found that the same tendency is shown in most cases similarly as in the case where the black pigment was used.

Thus, as is understood from Tables 1 to 12, by the use of the inkjet ink copolymers according to the invention, pigment dispersions with good dispersibility can be provided with good productivity and, moreover, an inkjet ink using the same is excellent also in the print density (coloring properties) and the fixability (abrasion properties) of a formed printed product. Moreover, since filter filterability becomes good by the use of the copolymers, an inkjet ink can be provided with good productivity.

TABLE 1

| | Use sample | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Copolymer | Copolymer composition (Weight ratio) | CHMA | 63 | 57.5 | 51 | 44 | 68.3 | 65.7 | 62 | 57.5 | 53 | 51 | 44 |
| | | BA | 14 | 14 | 14 | 14 | 14 | 14 | 14 | 14 | 15 | 14 | 14 |
| | | AA | 22 | 27.5 | 34 | 41 | 16.7 | 19.3 | 23 | 27.5 | 32 | 34 | 41 |
| | | St | 1 | 1 | 1 | 1 | 1 | 1 | 1 | 1 | — | 1 | 1 |
| | Weight average molecular weight | | 5300 | 5300 | 4800 | 4700 | 13000 | 12000 | 13000 | 9800 | 11000 | 12000 | 12000 |
| | Acid value (mgKOH/g) | | 160 | 198 | 242 | 283 | 126 | 144 | 166 | 200 | 223 | 241 | 291 |
| Black pigment dispersion | Average particle diameter (nm) | | 140 | 142 | 146 | 136 | 157 | 154 | 130 | 146 | 151 | 152 | 149 |
| | Viscosity (mPa·s) | | 2.9 | 3.1 | 3.2 | 3.9 | 3.3 | 3.1 | 3.4 | 3.3 | 4.0 | 5.3 | 10.7 |
| | pH | | 8.7 | 9.1 | 9.1 | 8.7 | 9.1 | 8.9 | 9.1 | 9.1 | 9.1 | 9.0 | 8.9 |
| | Filter filterability | | ○ | ○ | ○ | ○ | ○ | ○ | ○ | ○ | ○ | ○ | ○ |
| Ink | Print evaluation | OD | 1.23 | 1.23 | 1.16 | 1.18 | 1.30 | 1.29 | 1.26 | 1.25 | 1.23 | 1.21 | 1.18 |
| | | Abrasion properties | ○ | ○ | ○ | ○ | ○ | ○ | ○ | ○ | ○ | ○ | ○ |

TABLE 2

| | Use sample | | Example 12 | Example 13 | Example 14 | Example 15 | Example 16 | Example 17 |
|---|---|---|---|---|---|---|---|---|
| Copolymer | Copolymer composition (Weight ratio) | CHMA | 57.5 | 51 | 44 | 57.5 | 63 | 57.5 |
| | | BA | 14 | 14 | 14 | 14 | 14 | 14 |
| | | AA | 27.5 | 34 | 41 | 27.5 | 22 | 27.5 |
| | | St | 1 | 1 | 1 | 1 | 1 | 1 |
| | Weight average molecular weight | | 21000 | 25000 | 25000 | 30000 | 57000 | 52000 |
| | Acid value (mgKOH/g) | | 202 | 237 | 273 | 203 | 158 | 198 |
| Black pigment dispersion | Average particle diameter (nm) | | 159 | 181 | 179 | 171 | 230 | 223 |
| | Viscosity (mPa·s) | | 5.7 | 15.2 | 39.4 | 8.2 | 22.4 | 26.5 |
| | pH | | 9.2 | 8.8 | 8.7 | 9.0 | 9.2 | 9.1 |
| | Filter filterability | | ○ | ○ | ○ | ○ | ○ | ○ |
| Ink | Print evaluation | OD | 1.26 | 1.18 | 1.17 | 1.25 | 1.24 | 1.20 |
| | | Abrasion properties | ○ | ○ | ○ | ○ | ○ | ○ |

TABLE 3

| | Use sample | | Example 18 | Example 19 | Example 20 | Example 21 | Example 22 | Example 23 | Example 24 | Example 25 | Example 26 | Example 27 | Example 28 | Example 29 |
|---|---|---|---|---|---|---|---|---|---|---|---|---|---|---|
| Co-polymer | Co-polymer composition (Weight ratio) | CHMA | 77.2 | 71.5 | 65 | 58 | 77.2 | 71.5 | 65 | 58 | 77.2 | 71.5 | 65 | 58 |
| | | AA | 21.8 | 27.5 | 34 | 41 | 21.8 | 27.5 | 34 | 41 | 21.8 | 27.5 | 34 | 41 |
| | | St | 1 | 1 | 1 | 1 | 1 | 1 | 1 | 1 | 1 | 1 | 1 | 1 |
| | Weight average molecular weight | | 5100 | 5100 | 5400 | 5200 | 12000 | 13000 | 13000 | 13000 | 31000 | 33000 | 31000 | 32000 |
| | Acid value (mgKOH/g) | | 160 | 202 | 242 | 294 | 160 | 194 | 240 | 270 | 154 | 191 | 230 | 271 |
| Black pigment dispersion | Average particle diameter (nm) | | 143 | 144 | 152 | 149 | 150 | 146 | 158 | 158 | 190 | 188 | 180 | 172 |
| | Viscosity (mPa·s) | | 3.0 | 2.9 | 3.7 | 4.0 | 3.4 | 3.8 | 5.0 | 8.2 | 14.2 | 9.9 | 15.6 | 46.2 |
| | pH | | 9.1 | 8.9 | 9.1 | 9.0 | 9.3 | 9.1 | 9.1 | 8.7 | 9.2 | 8.9 | 9.0 | 8.8 |
| | Filter filterability | | ○ | ○ | ○ | ○ | ○ | ○ | ○ | ○ | ○ | ○ | ○ | ○ |
| Ink | Print evaluation | OD | 1.27 | 1.23 | 1.23 | 1.19 | 1.28 | 1.25 | 1.23 | 1.21 | 1.24 | 1.23 | 1.21 | 1.19 |
| | | Abrasion properties | ○ | ○ | ○ | ○ | ○ | ○ | ○ | ○ | ○ | ○ | ○ | ○ |

TABLE 4

| | Use sample | | Example 30 | Example 31 | Example 32 |
|---|---|---|---|---|---|
| Co-polymer | Copolymer composition (Weight ratio) | CHMA | 70.5 | 46.5 | 46.5 |
| | | BA | 1 | 25 | 1 |
| | | AA | 27.5 | 27.5 | 27.5 |
| | | St | 1 | 1 | 25 |
| | Weight average molecular weight | | 53000 | 53000 | 48000 |
| | Acid value (mgKOH/g) | | 198 | 198 | 198 |
| Black pigment dispersion | Average particle diameter (nm) | | 138 | 140 | 147 |
| | Viscosity (mPa·s) | | 3.0 | 3.1 | 3.2 |
| | pH | | 8.9 | 9.0 | 9.0 |
| | Filter filterability | | ○ | ○ | ○ |
| Ink | Print evaluation | OD | 1.25 | 1.19 | 1.20 |
| | | Abrasion properties | ○ | ○ | ○ |

TABLE 5

| | Use sample | | Comparative Example 1 | Comparative Example 2 | Comparative Example 3 | Comparative Example 4 | Comparative Example 5 | Comparative Example 6 |
|---|---|---|---|---|---|---|---|---|
| Copolymer | Copolymer composition (Weight ratio) | BzA | 64 | 52 | 70.5 | — | — | — |
| | | BzMA | — | — | — | 71.5 | — | — |
| | | CHA | — | — | — | — | 69 | 65 |
| | | MAA | 19 | 26 | 16 | — | 16 | 18.5 |
| | | AA | 16 | 22 | 13.5 | 28.4 | 14 | 15.5 |
| | | St | 1 | — | — | 0.5 | 1 | 1 |
| | Weight average molecular weight | | 12000 | 13000 | 33000 | 30000 | 32000 | 34000 |
| | Acid value (mgKOH/g) | | 228 | 300 | 193 | 203 | 197 | 220 |

TABLE 5-continued

|  | Use sample | Comparative Example 1 | Comparative Example 2 | Comparative Example 3 | Comparative Example 4 | Comparative Example 5 | Comparative Example 6 |
|---|---|---|---|---|---|---|---|
| Black pigment dispersion | Average particle diameter (nm) | 146 | 165 | 161 | 167 | 218 | 213 |
|  | Viscosity (mPa·s) | 4.8 | 26.1 | 15.7 | 12.4 | 25.6 | 77.1 |
|  | pH | 7.8 | 8.6 | 8.7 | 8.7 | 9.1 | 8.9 |
|  | Filter filterability | ○ | ○ | X | Δ | X | X |
| Ink | Print evaluation OD | 1.10 | 1.12 | 1.19 | 1.10 | 1.22 | 1.22 |
|  | Abrasion properties | X | Δ | Δ | X | Δ | Δ |

TABLE 6

|  | Use sample |  | Example 1 | Example 2 | Example 3 | Example 4 | Example 5 | Example 6 | Example 7 | Example 8 | Example 9 | Example 10 | Example 12 | Example 16 |
|---|---|---|---|---|---|---|---|---|---|---|---|---|---|---|
| Copolymer | Copolymer composition (Weight ratio) | CHMA | 63 | 57.5 | 51 | 44 | 68.3 | 65.7 | 62 | 57.5 | 53 | 51 | 57.5 | 63 |
|  |  | BA | 14 | 14 | 14 | 14 | 14 | 14 | 14 | 14 | 15 | 14 | 14 | 14 |
|  |  | AA | 22 | 27.5 | 34 | 41 | 16.7 | 19.3 | 23 | 27.5 | 32 | 34 | 27.5 | 22 |
|  |  | St | 1 | 1 | 1 | 1 | 1 | 1 | 1 | 1 | — | 1 | 1 | 1 |
|  | Weight average molecular weight |  | 5300 | 5300 | 4800 | 4700 | 13000 | 12000 | 13000 | 9800 | 11000 | 12000 | 21000 | 57000 |
|  | Acid value (mgKOH/g) |  | 160 | 198 | 242 | 283 | 126 | 144 | 166 | 200 | 223 | 241 | 202 | 158 |
| Black pigment dispersion | Average particle diameter (nm) |  | 128 | 117 | 113 | 114 | 220 | 174 | 146 | 121 | 122 | 124 | 177 | 204 |
|  | Viscosity (mPa·s) |  | 3.8 | 4.5 | 5.0 | 5.9 | 4.5 | 4.6 | 5.4 | 4.7 | 6.3 | 10.1 | 25.6 | 46.6 |
|  | pH |  | 9.2 | 9.4 | 9.5 | 9.1 | 8.6 | 9.1 | 9.6 | 9.3 | 9.2 | 9.4 | 9.2 | 9.3 |
|  | Filter filterability |  | ○ | ○ | ○ | ○ | ○ | ○ | ○ | ○ | ○ | ○ | ○ | ○ |
| Ink | Print evaluation OD |  | 1.09 | 1.06 | 1.04 | 0.99 | 1.10 | 1.08 | 1.09 | 1.04 | 1.05 | 1.05 | 1.02 | 1.04 |
|  | Abrasion properties |  | ○ | ○ | ○ | ○ | ○ | ○ | ○ | ○ | ○ | ○ | ○ | ○ |

TABLE 7

|  | Use sample |  | Example 22 | Example 23 | Example 30 | Example 31 | Example 32 | Example 33 |
|---|---|---|---|---|---|---|---|---|
| Copolymer | Copolymer composition (Weight ratio) | CHMA | 77.2 | 71.5 | 70.5 | 46.5 | 46.5 | 63 |
|  |  | BA | — | — | 1 | 25 | 1 | — |
|  |  | LMA | — | — | — | — | — | 14 |
|  |  | AA | 21.8 | 27.5 | 27.5 | 27.5 | 27.5 | 22 |
|  |  | St | 1 | 1 | 1 | 1 | 25 | 1 |
|  | Weight average molecular weight |  | 12000 | 13000 | 5300 | 5300 | 4800 | 4900 |
|  | Acid value (mgKOH/g) |  | 160 | 194 | 198 | 198 | 198 | 160 |
| Black pigment dispersion | Average particle diameter (nm) |  | 151 | 140 | 112 | 115 | 110 | 145 |
|  | Viscosity (mPa·s) |  | 6.3 | 8.7 | 3.0 | 4.6 | 5.5 | 8.6 |
|  | pH |  | 9.7 | 9.5 | 8.9 | 9.1 | 9.2 | 9.1 |
|  | Filter filterability |  | ○ | ○ | ○ | ○ | ○ | ○ |
| Ink | Print evaluation OD |  | 1.07 | 1.08 | 1.08 | 1.00 | 1.01 | 1.08 |
|  | Abrasion properties |  | ○ | ○ | ○ | ○ | ○ | ○ |

TABLE 8

|  | Use sample |  | Comparative Example 1 | Comparative Example 4 | Comparative Example 7 |
|---|---|---|---|---|---|
| Copolymer | Copolymer composition (Weight ratio) | BzA | 64 | — | — |
|  |  | BzMA | — | 71.1 | — |
|  |  | CHA | — | — | 69 |
|  |  | MAA | 19 | — | 16 |
|  |  | AA | 16 | 28.4 | 14 |
|  |  | St | 1 | 0.5 | 1 |
|  | Weight average molecular weight |  | 12000 | 30000 | 11000 |
|  | Acid value (mgKOH/g) |  | 228 | 208 | 206 |

TABLE 8-continued

|  | Use sample | Comparative Example 1 | Comparative Example 4 | Comparative Example 7 |
|---|---|---|---|---|
| Black pigment dispersion | Average particle diameter (nm) | 116 | 122 | 122 |
|  | Viscosity (mPa · s) | 8.2 | 6.8 | 6.8 |
|  | pH | 7.9 | 8.2 | 8.2 |
|  | Filter filterability | ○ | Δ | X |
| Ink | Print evaluation OD | 0.91 | 0.91 | 1.06 |
|  | Abrasion properties | ○ | ○ | ○ |

TABLE 9

|  | Use sample |  | Example 5 | Example 7 | Example 22 | Example 23 | Example 30 | Example 31 | Example 32 |
|---|---|---|---|---|---|---|---|---|---|
| Copolymer | Copolymer composition (Weight ratio) | CHMA | 68.3 | 62 | 77.2 | 71.5 | 81.3 | 57.3 | 57.3 |
|  |  | BA | 14 | 14 | — | — | 1 | 25 | 1 |
|  |  | AA | 16.7 | 23 | 21.8 | 27.5 | 16.7 | 16.7 | 16.7 |
|  |  | St | 1 | 1 | 1 | 1 | 1 | 1 | 25 |
|  | Weight average molecular weight |  | 13000 | 13000 | 12000 | 13000 | 13000 | 12000 | 13000 |
|  | Acid value (mgKOH/g) |  | 126 | 166 | 160 | 194 | 126 | 126 | 126 |
| Black pigment dispersion | Average particle diameter (nm) |  | 124 | 110 | 113 | 113 | 113 | 112 | 110 |
|  | Viscosity (mPa · s) |  | 3.7 | 3.8 | 3.8 | 4.6 | 3.5 | 3.6 | 4.0 |
|  | pH |  | 8.8 | 8.9 | 9.3 | 9.2 | 8.9 | 9.1 | 9.2 |
|  | Filter filterability |  | ○ | ○ | ○ | ○ | ○ | ○ | ○ |
| Ink | Print evaluation | OD | 1.09 | 1.07 | 1.08 | 1.04 | 1.10 | 1.07 | 1.08 |
|  |  | Abrasion properties | ○ | ○ | ○ | ○ | ○ | ○ | ○ |

TABLE 10

|  | Use sample |  | Comparative Example 1 | Comparative Example 4 | Comparative Example 7 |
|---|---|---|---|---|---|
| Co-polymer | Copolymer composition (Weight ratio) | BzA | 64 | — | — |
|  |  | BzMA | — | 71.1 | — |
|  |  | CHA | — | — | 69 |
|  |  | MAA | 19 | — | 16 |
|  |  | AA | 16 | 28.4 | 14 |
|  |  | St | 1 | 0.5 | 1 |
|  | Weight average molecular weight |  | 12000 | 30000 | 11000 |
|  | Acid value (mgKOH/g) |  | 228 | 203 | 206 |
| Red pigment dispersion | Average particle diameter (nm) |  | 112 | 111 | 116 |
|  | Viscosity (mPa · s) |  | 3.5 | 3.9 | 4.5 |
|  | pH |  | 8.9 | 9.6 | 9.1 |
|  | Filter filterability |  | ○ | Δ | X |
| Ink | Print evaluation | OD | 0.97 | 0.99 | 1.08 |
|  |  | Abrasion properties | ○ | ○ | ○ |

TABLE 11

|  | Use sample |  | Example 5 | Example 7 | Example 22 | Example 23 | Example 30 | Example 31 | Example 32 |
|---|---|---|---|---|---|---|---|---|---|
| Copolymer | Copolymer composition (Weight ratio) | CHMA | 68.3 | 62 | 77.2 | 71.5 | 81.3 | 57.3 | 57.3 |
|  |  | BA | 14 | 14 | — | — | 1 | 25 | 1 |
|  |  | AA | 16.7 | 23 | 21.8 | 27.5 | 16.7 | 16.7 | 16.7 |
|  |  | St | 1 | 1 | 1 | 1 | 1 | 1 | 25 |
|  | Weight average molecular weight |  | 13000 | 13000 | 12000 | 13000 | 13000 | 12000 | 13000 |
|  | Acid value (mgKOH/g) |  | 126 | 166 | 160 | 194 | 126 | 126 | 126 |
| Black pigment dispersion | Average particle diameter (nm) |  | 135 | 138 | 128 | 128 | 128 | 125 | 131 |
|  | Viscosity (mPa · s) |  | 3.1 | 3.3 | 3.3 | 3.9 | 3.2 | 3.3 | 3.8 |
|  | pH |  | 9.0 | 9.1 | 9.4 | 8.3 | 8.9 | 9.1 | 9.2 |
|  | Filter filterability |  | ○ | ○ | ○ | ○ | ○ | ○ | ○ |
| Ink | Print evaluation | OD | 1.22 | 1.18 | 1.18 | 1.17 | 1.24 | 1.15 | 1.16 |
|  |  | Abrasion properties | ○ | ○ | ○ | ○ | ○ | ○ | ○ |

TABLE 12

|  |  |  | Comparative Example 1 | Comparative Example 4 | Comparative Example 7 |
|---|---|---|---|---|---|
| Co-polymer | Copolymer composition (Weight ratio) | BzA | 64 | — | — |
|  |  | BzMA | — | 71.1 | — |
|  |  | CHA | — | — | 69 |
|  |  | MAA | 19 | — | 16 |
|  |  | AA | 16 | 28.4 | 14 |
|  |  | St | 1 | 0.5 | 1 |
|  | Weight average molecular weight |  | 12000 | 30000 | 11000 |
|  | Acid value (mgKOH/g) |  | 228 | 203 | 206 |
| Yellow pigment dispersion | Average particle diameter (nm) |  | 123 | 129 | 138 |
|  | Viscosity (mPa·s) |  | 3.5 | 5.1 | 3.6 |
|  | pH |  | 9.3 | 9.0 | 8.9 |
|  | Filter filterability |  | ○ | Δ | X |
| Ink | Print evaluation | OD | 1.02 | 1.03 | 1.17 |
|  |  | Abrasion properties | ○ | ○ | ○ |

TABLE 13

| Compostion | Part by weight |
|---|---|
| Pigment dispersion (Black or Blue) | 20 |
| Triethylene glycol monobutyl ether | 10 |
| Diethylene glycol | 15 |
| Surfactant | 0.8 |
| Water | 54.2 |

TABLE 14

| Compostion | Part by weight |
|---|---|
| Pigment dispersion (Red or Yellow) | 26.7 |
| Triethylene glycol monobutyl ether | 10 |
| Diethylene glycol | 15 |
| Surfactant | 0.8 |
| Water | 47.5 |

The invention claimed is:

1. An inkjet ink copolymer, comprising:
   10 to 96% by weight of a cyclohexyl methacrylate unit;
   1 to 90% by weight of an acrylic acid unit, and
   1 to 25% by weight of an alkyl(meth)acrylate unit.

2. The inkjet ink copolymer according to claim 1, wherein the copolymer contains 1 to 25% by weight of a styrene unit.

3. An inkjet ink copolymer, consisting of:
   10 to 96% by weight of cyclohexyl methacrylate unit;
   1 to 90% by weight of an acrylic acid unit, and
   1 to 25% by weight of a styrene unit.

4. The inkjet ink copolymer according to claim 1 or 3, wherein an acid value of the copolymer is 10 to 300 mgKOH/g.

5. An inkjet ink pigment dispersion, comprising:
   the inkjet ink copolymer according to claim 1 or 3; and
   a pigment.

6. The inkjet ink pigment dispersion according to claim 5, wherein an average particle diameter of the pigment is 300 nm or lower.

7. An ink jet ink, comprising the inkjet ink copolymer according to claim 1 or 3.

8. The inkjet ink copolymer according to claim 1 or 3, wherein a weight average molecular weight of the copolymer is 4500 to 150000.

* * * * *